United States Patent [19]

Kubota

[11] Patent Number: 5,562,558
[45] Date of Patent: Oct. 8, 1996

[54] CHAIN

[76] Inventor: Masao Kubota, 22-7, Narimasu 2-chome, Itabashi-ku, Tokyo, 175, Japan

[21] Appl. No.: 356,225
[22] PCT Filed: Jan. 14, 1994
[86] PCT No.: PCT/JP94/00047
   § 371 Date: Dec. 19, 1994
   § 102(e) Date: Dec. 19, 1994
[87] PCT Pub. No.: WO94/25776
   PCT Pub. Date: Nov. 10, 1994

[30] Foreign Application Priority Data

Apr. 26, 1993 [JP] Japan .................................. 5-132274

[51] Int. Cl.⁶ .................................................... F16G 13/02
[52] U.S. Cl. ............................................................ 474/209
[58] Field of Search ........................................ 474/209, 210, 474/212–217, 201

[56] References Cited

U.S. PATENT DOCUMENTS 690,317  12/1901  Renold ..................................... 474/213
1,598,906  9/1926  Dull ........................................ 474/214
3,074,290  1/1963  Eastep .

FOREIGN PATENT DOCUMENTS 0284595  9/1988  European Pat. Off. .
406741  of 0000  France .
52-44579  3/1977  Japan .
4-34513  3/1992  Japan .

Primary Examiner—Roger J. Schoeppel
Attorney, Agent, or Firm—Staas & Halsey

[57] ABSTRACT

A chain for use in transmission and transportation with low friction, less wear, and low noises. The chain has central portions directly in engagement with a sprocket tooth face. Each of a number of pins is supported by rolling bearings attached individually to one of inside link plates and outside link plates, and plain bearings attached to the other link plates. With this arrangement, the sprocket tooth face and pin tooth face are brought into rolling contact with one another, and the link plates bend relatively to one another as the pins rotate in rolling contact. Also, the size and weight of the chain are reduced. Since the entire amount of friction and wear are small, power loss and elongation are reduced to thereby preserve a high accuracy of the chain.

9 Claims, 12 Drawing Sheets

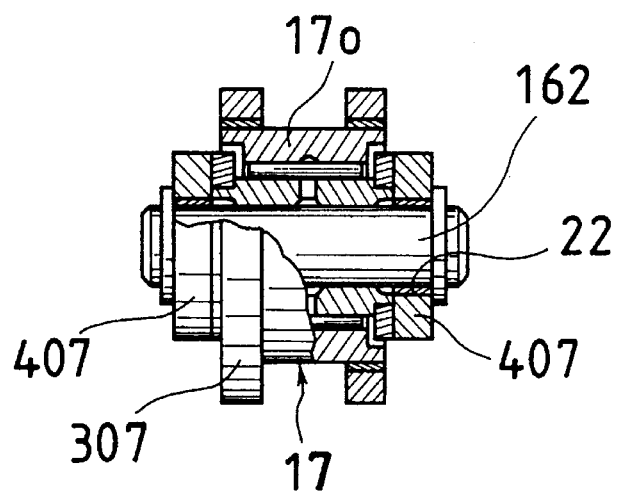
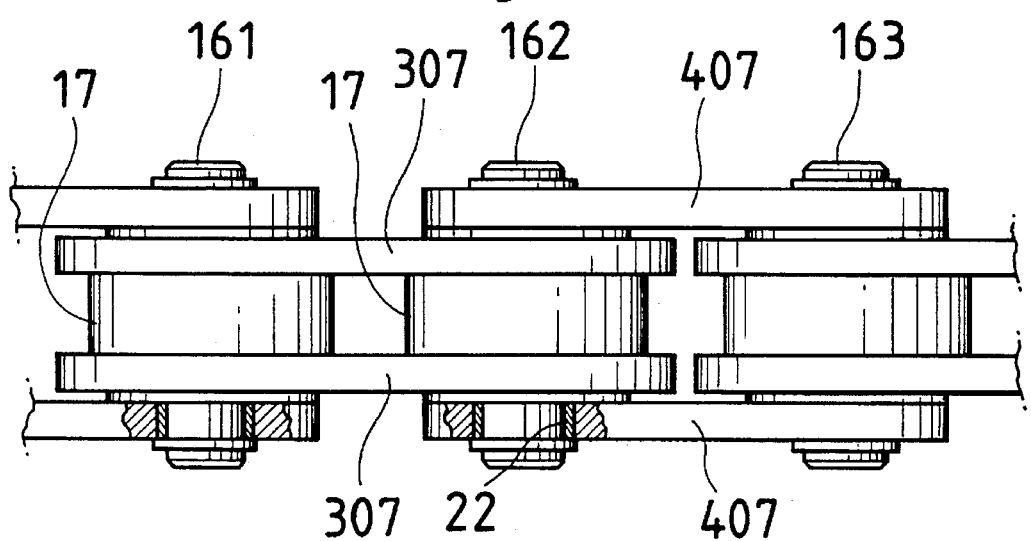
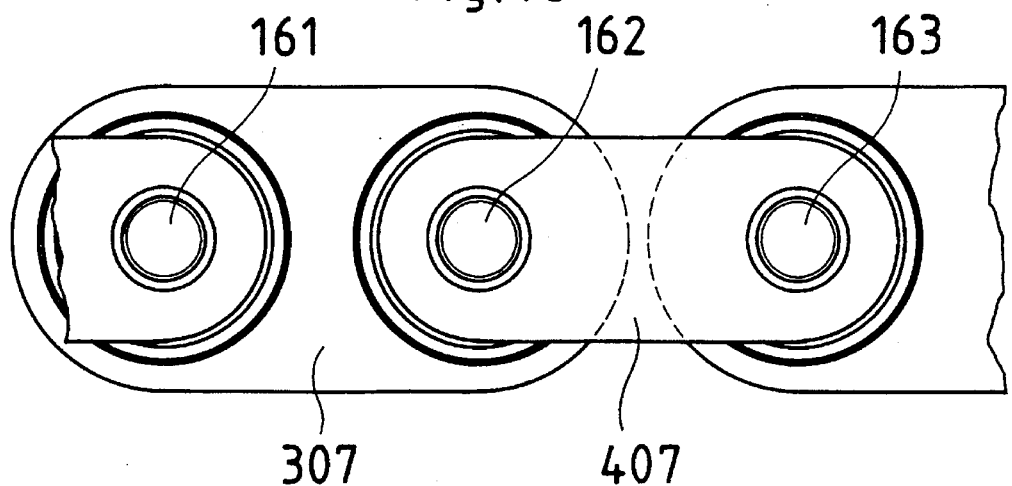

CHAIN

TECHNICAL FIELD

The present invention relates to a chain used for high-accuracy transmission and transportation which requires a low friction and a high wear resistance, and more particularly, to a chain provided with pins freely rotatable with respect to link plates.

BACKGROUND ART

In roller chains and bush chains which have conventionally been used for transmission and transportation, pins and bushes are fixed to outside link plates and inside link plates, respectively. Since the pins and bushes are in sliding contact with one another, they are subject to high friction and heavy wear to cause significant elongation of the chain as well as power loss. Thus, this type of chain is not considered to be suitable for such use that requires high-accuracy positioning. Also, the bushes and rollers significantly wear and make loud noises by the engagement of the chain and a sprocket. As one of the countermeasures to reduce friction and wear, there is known an arrangement such that needle roller bearings are interposed between the pins and the bushes. In this arrangement, however, the interposition of needle rollers causes a problem such as a decrease of the pin diameter and a reduction of the load-carrying capacity. Some chains for heavy-load suspension have no bushes. However, as such pins are directly fitted in link plates, these chains are extremely disadvantageous in terms of friction resistance and wear resistance in transmission or transportation service, and furthermore, the pins have no tooth face for drive.

DISCLOSURE OF THE INVENTION

The present invention provides a chain for transmission and transportation with low friction, high wear resistance, a large load-carrying capacity and low noise.

A conventionally used triple structure at pin-bush-roller structure, is replaced with a structure in which pins can rotate with low friction with respect to all link plates connecting the adjacent pins. Rolling bearings are suitable as bearings for this structure, but plain bearings may also be used if pins of a large diameter are adopted.

A chain according to one aspect of the present invention comprises a plurality of pins arranged parallel to one another at regular intervals and each having a tooth face to be directly in contact with a tooth face of a sprocket, a plurality of first link plates for connecting each of two adjacent pins, a plurality of second link plates for connecting each of two adjacent pins not connected by the first link plates, and bearings respectively attached to the first and second link plates for rotatably supporting the pins.

According to another aspect of the present invention, each pin is supported by at least one rolling bearing attached to one of the link plates and a plain bearing attached to the other link plate. The chain bends when it is brought into engagement with the sprocket through the rotation of the pins allowed by the rolling bearings due to the difference in frictional force between the plain bearings and the rolling bearings.

Tooth faces of the chain for an engagement with the sprocket teeth are formed on the outer peripheral surfaces of the pins or the outer rings of the rolling bearings. When the outer peripheral surfaces of the pins are used as the tooth faces, only half the number of rolling bearings and half the number of plain bearings are provided. When the outer rings of the rolling bearings are used as the tooth faces, a part of the outer peripheral surface of each rolling bearing is supported by a plain bearing, and a space to allow the entry of a sprocket tooth is provided on one side of each link plate with which the sprocket tooth face is to be engaged. The outer peripheral surface of the outer ring of the rolling bearing exposed to the space is used as a tooth face to be engaged with the sprocket tooth face. The engagement with the sprocket is made in the rolling contact without the use of rollers.

BRIEF DESCRIPTION OF THE DRAWINGS

FIG. 1c is a sectional view taken along line I—I of FIG. 1a;

FIG. 2b is a sectional view taken along line II—II of FIG. 2a;

FIG. 5c is sectional view taken along line V—V of FIG. 5a;

FIG. 7a is a cutaway front view of a chain according to a seventh embodiment of the present invention, FIG. 7b is a cutaway plan view of this chain, and FIG. 7c is a side view of this chain;

BEST MODE OF CARRYING OUT THE INVENTION

Chains of the present invention may be classified depending on whether an element serving as a tooth profile is composed of a pin, or an outer ring of a rolling bearing, or a combination of the two. The chains are also classified by the number of rolling bearings for each pin, link plate shape, pitch (long or short), row (single or multiple), and bearing lubrication (open or sealed). A large number of forms can be obtained by combining these factors.

The following are descriptions of practically important embodiments in consideration of productivity and economical efficiency.

Figure 1A:
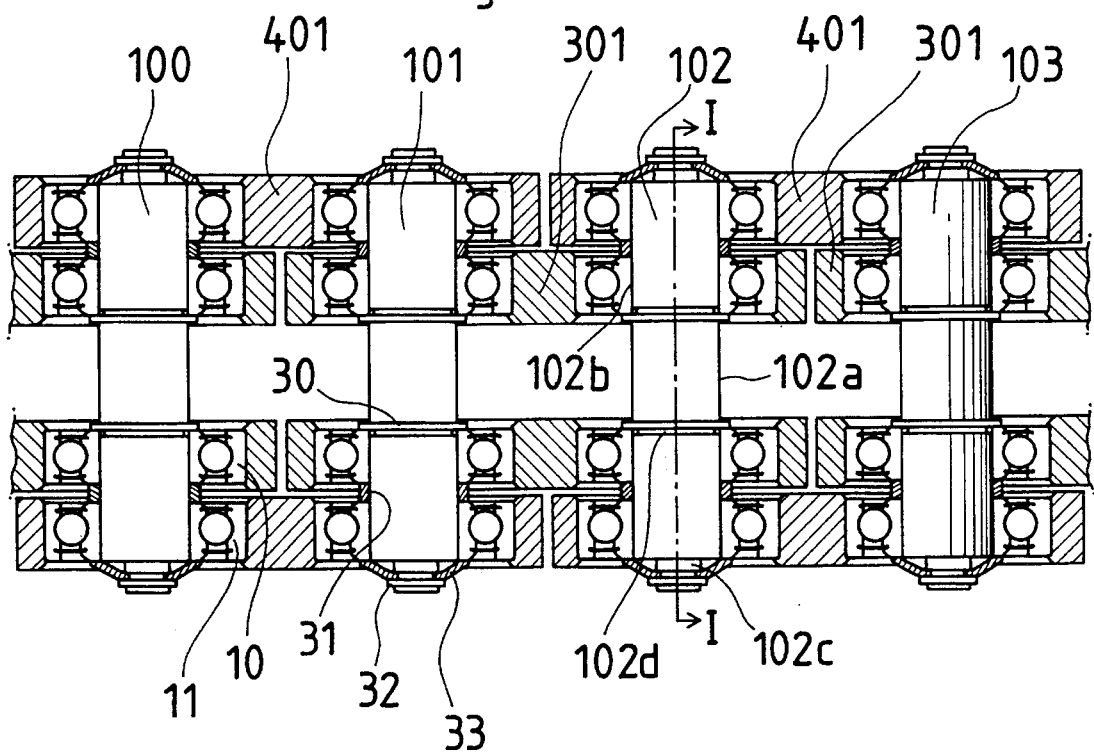
FIG. 1a is a plan sectional view of a chain according to a first embodiment of the present invention.
Figure 1B:
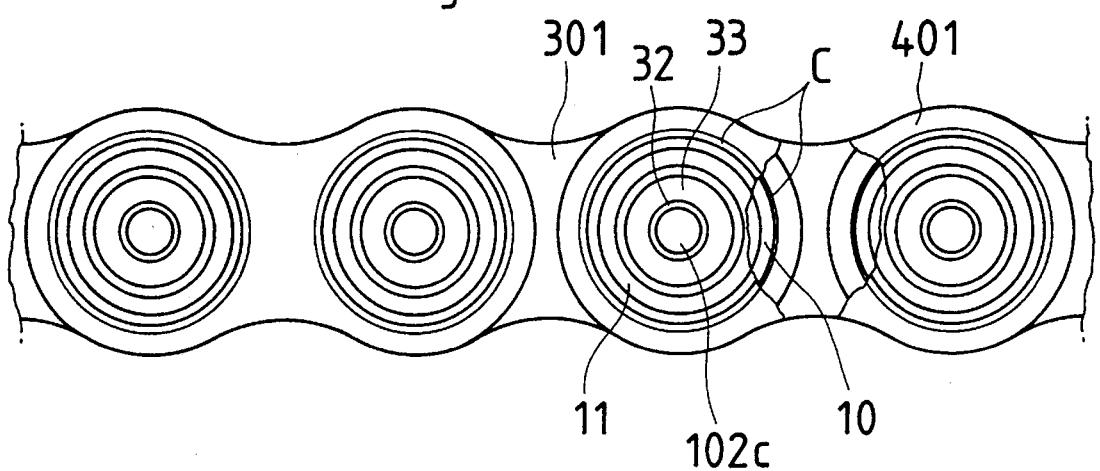
FIG. 1b is a cutaway side view of the chain.
Figure 1C:
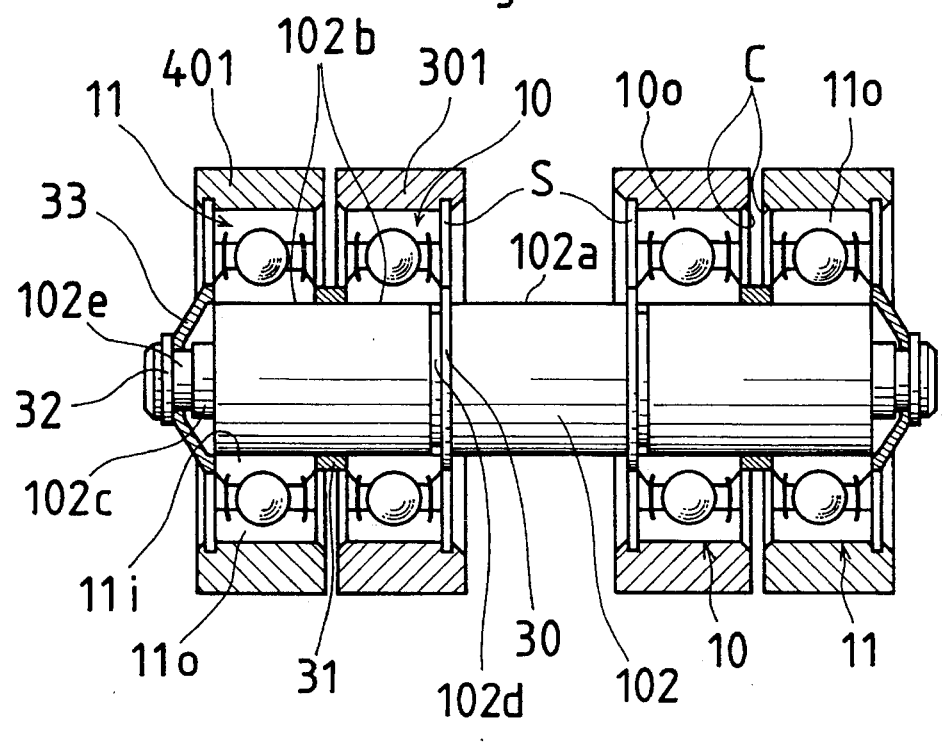

FIGS. 1a, 1b and 1c show a first embodiment of the present invention. Pins 100, 101, 102, 103, ... are arranged parallel to one another at regular intervals. In the embodiments described below, the outside diameter of each pin, except those portions on which snap rings are fitted, is uniform. Sets of each two adjacent pins, i.e., the pins 101 and 102, the pin 103 and its adjacent pin, ..., are connected by inner link plates 301, individually. Those sets of adjacent pins, including 100 and 101, pins 102 and 103, ..., which are not connected by the inner link plates 301, are connected by outer link plates 401, individually. The individual pins 100 to 103 are rotatably supported by sealed rolling bearings 10 and 11 which are attached to the inner and outer link plates 301 and 401, respectively.

With respect to the pin 102, as an example, a central portion 102a and outside mounting portions 102b, which mate with the mounting faces of the respective inner rings of the bearings 10 and 11, have the same diameters. The central portion 102a of the pin constitutes a tooth face to be directly in engagement with a tooth face of a sprocket, and snap rings 30 are fitted individually in ring grooves 102d on the tooth face end. Various commercially available snap rings are used as the snap rings 30, depending on their sizes. For example, C-shaped snap rings standardized by JIS B 2804, E-shaped snap rings by JIS B 2805, C-shaped concentric snap rings by JIS B 2806, etc., are available. A spacer 31 is interposed between each of the inner rings of inside rolling bearings 10 and each of the inner rings of the corresponding outside rolling bearings 11. Snap rings may be used as the spacers 31, but it is not necessary to provide ring grooves on the pins.

Although the respective inner rings of the bearings 10 and 11 are tightly fitted on an outside portion 102 of the pin 102, suitable fastening means is used for preventing the loosening during operation. For example, as shown in FIG. 1c, a conical spring washer 33 is interposed between a C-shaped concentric snap ring 32, which is fitted in a ring groove 102e at an end 102c of the pin 102, and an inner ring 11i of the outside rolling bearing 11. Larger and smaller ends of the washer 33 are finished so as to fit their corresponding contact surfaces. In pushing the snap ring 32 in, its axial dimensional errors in assembly are absorbed by elastic deformation of the washer 33, thus ensuring assembly without rattling. The diameter of the pin end 102c may be reduced as illustrated in accordance with the dimensions of the conical spring washer 33 to be used. In order to reduce the weight of the structure without reducing its strength, according to the present embodiment, the inside and outside link plates 301 and 401 has a profile obtained by connecting two circles with the same diameter by curved lines to be constricted in the middle portion, i.e., the shape of a cocoon, as shown in FIG. 1b.

Since no thrust acts on the rolling bearings 10 and 11, their outer rings may be fixed to uniform-diameter holes in the link plates by various means, including snap rings, caulking, setscrews, etc. According to the present embodiment, as shown in FIG. 1c, the side faces of the inside and outside link plates 301 and 401 are projected a little from the respective side faces of outer Pings 10o and 11o of the rolling bearings 10 and 11, and one end portion of each hole is made to swell by caulking. Rounded portions of the outer Pings 10o and 11o are held to abut individually against caulked portions C. A snap ring S for a hole is fitted in the other side of the hole for each of the inside and outside link plates 301 and 401, thereby making easier the removal of the bearings 10 and 11.

Instead of the ring groove 102d and the snap ring 30, a hard-faced stationary sleeve (not shown) is fitted on the central portion 102a of the pin so that it serves as fastening means for the bearing 10 and also constitutes a tooth face. Also, the stepped pin may be used that the diameter of the central portion 102a is greater than that of the end mounting portions 102b which are fitted in the respective inner rings of the rolling bearings 10 and 11. C-shaped concentric snap rings may be used as fastening means at the ends of the pin 102 which have the same diameter as that of the central portion 102a. In this case, however, it is advisable to use rather large elastic spacers, such as O-rings, as the spacers 31.

The bearings used in this embodiment are sealed deep-groove ball bearings which need not be further lubricated and are available at low prices and in bulk. However, if the load-carrying capacity is expected to be made particularly large, roller bearings can be used. In order not to use the bearings with excessively large outside diameters, needle roller bearings (with or without inner rings) may be used. The pins need not always be solid, and hollow ones may be used to reduce the weight. In this case, the pins may be penetrated by functional bars and the like.

Figure 2A:
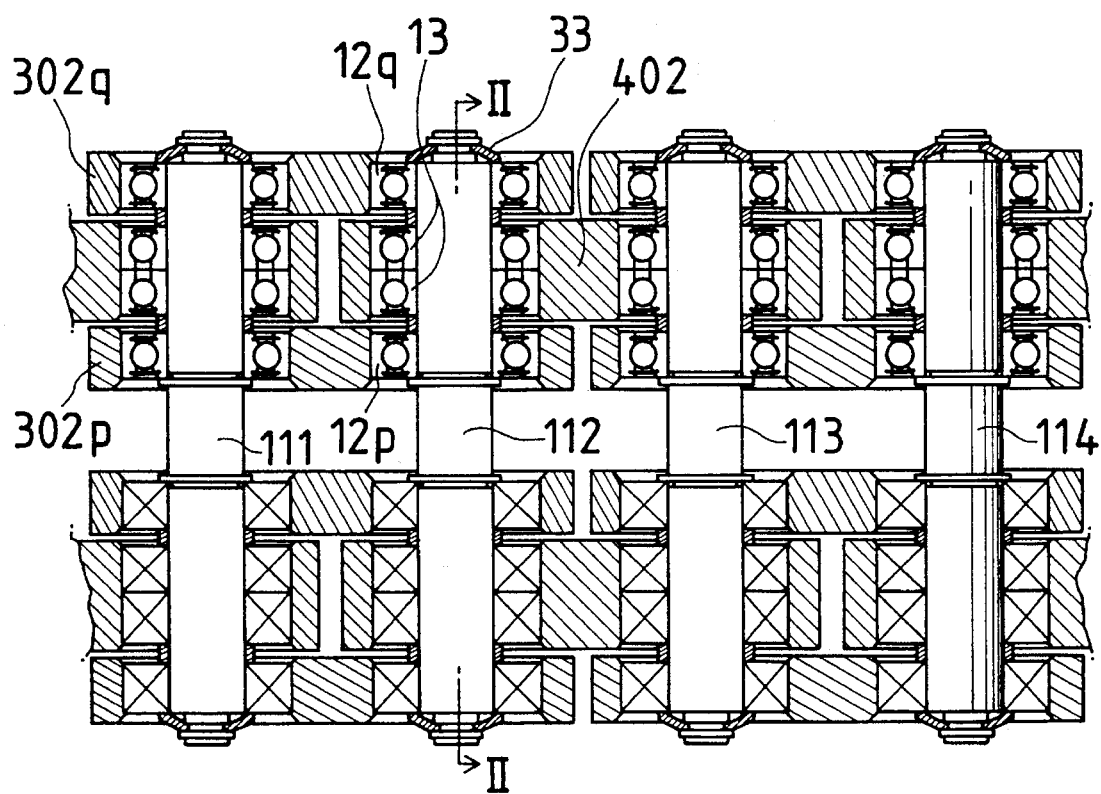
FIG. 2a is a plan sectional view of a balance-type link plate chain according to a second embodiment of the present invention.
Figure 2B:
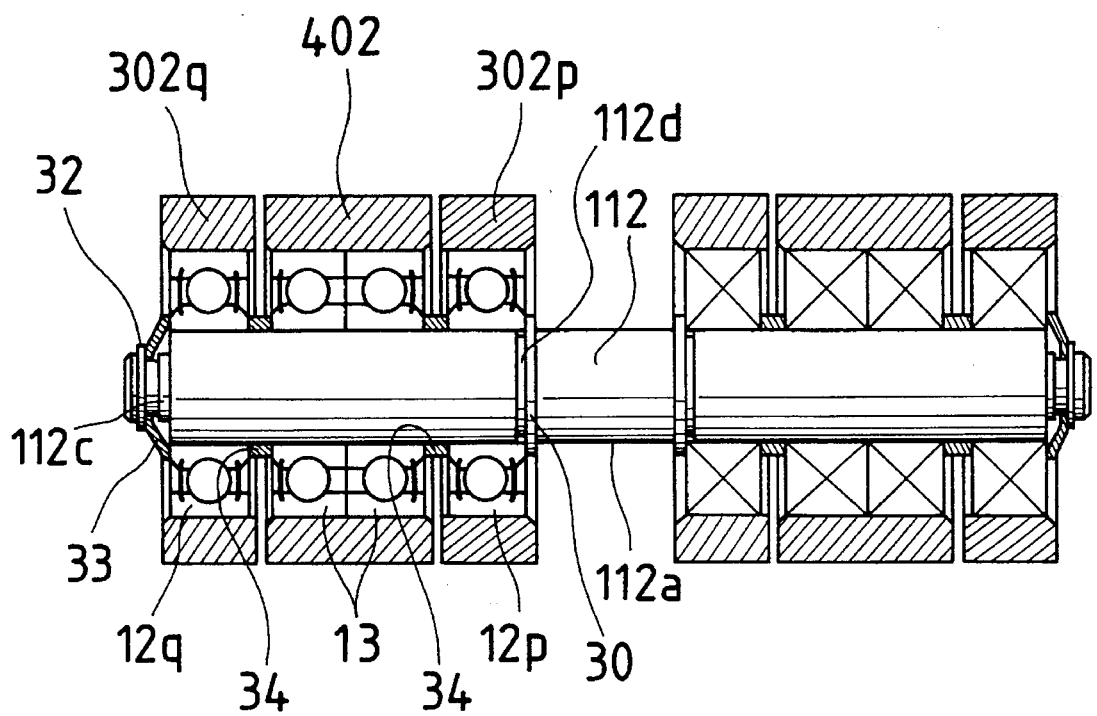

FIGS. 2a and 2b show a second embodiment of the present invention. This embodiment represents a balanced link plate chain with an increased load-carrying capacity. Pins 111 and 112 are connected by innermost link plates 302p and outermost link plates 302q, while pins 112 and 113 are connected by central link plates 402 which are arranged between the link plates 302p and 302q. The central link plates 402 are made substantially twice as thick as the link plates 302p and 302q in order to balance the strength. The link plates 302p and 302q are provided with sealed ball bearings 12p and 12q, respectively, and each central link plate 402 is provided with a face-to-face combination of two single-side-sealed ball bearings 13. Snap rings 30 are fitted individually in ring grooves 112d on the pin 112, and abut against the respective inner rings of the ball bearings 12p. Spacers 34 are interposed individually between inner rings of the ball bearings 12p and 13 and between inner rings of the ball bearings 12q and 13. A snap ring 32 and a washer 33, similar to the ones in the foregoing embodiment, are provided at each pin end 112c. A central portion 112a of the pin 112 constitutes a tooth face to be engaged with a sprocket. It is preferable to make the diameter of the pin 112 larger for increasing the load-carrying capacity.

Figure 3:
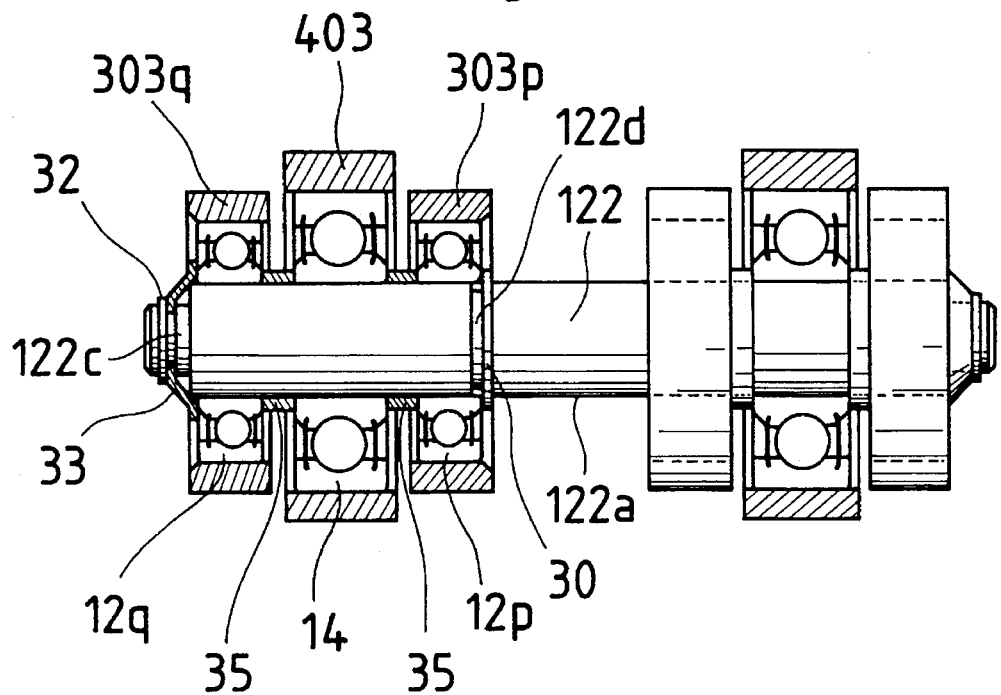
FIG. 3 is a front sectional view of a chain according to a third embodiment of the present invention.

FIG. 3 shows a third embodiment of the present invention. In this embodiment, a single ball bearing 14, which has the same inside diameter as that of the ball bearings 12p and 12q and also has a load-carrying capacity about twice that of the ball bearings 12p and 12q, is used instead of a combination of the two ball bearings 13 in the second embodiment. With the arrangement, the dimensions (thickness and width) of a central link plate 403 disposed between link plates 303p and 303q are increased to balance the strength. As in the second embodiment, a pin 122 has a central portion 122a to be used as a tooth face, end portions 122c and ring grooves 122d. Spacers 35 are interposed individually between inner rings of the ball bearings 12p and 14 and between inner rings of the ball bearings 12q and 14.

Figure 4A:
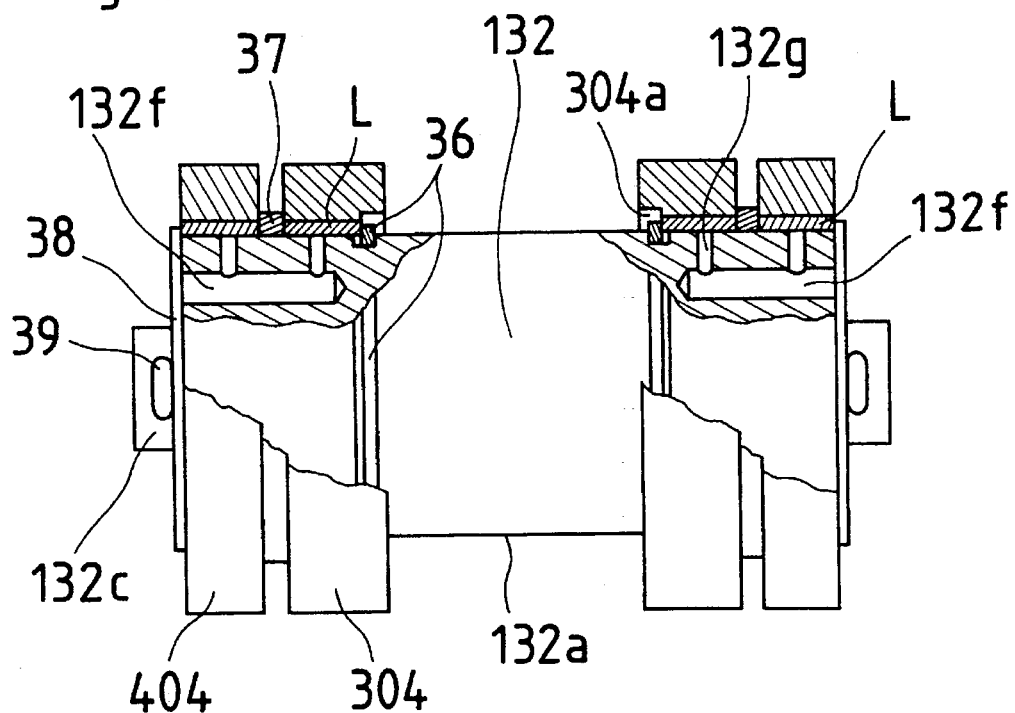
FIG 4a is a cutaway front view of a chain according to a fourth embodiment of the present invention.
Figure 4B:
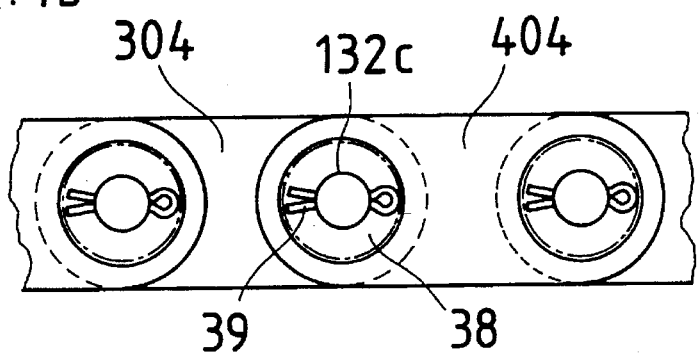
FIG. 4b is a side view of this chain.
Figure 4C:
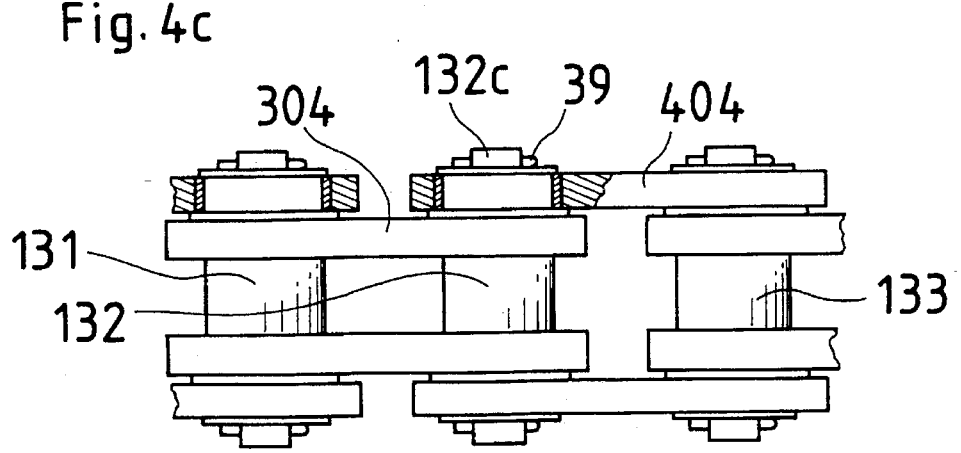
FIG. 4c is a cutaway plan view of this chain.

FIGS. 4a, 4b and 4c show a fourth embodiment of the present invention.

According to the chain of the present invention, as compared with the conventional roller chains, the diameters of pins can be made much larger. Therefore, plain bearings fully stand up to use if their link plates are rather thick. According to the present embodiment, the pins are rotatably supported on the link plates by means of plain bearings. Liners L made from a bearing material (bearing alloy such as gun metal, oil retaining bearing material, tetrafluoroethylene resin, etc.) are fitted individually in fitting holes of link plates 304 and 404. The liners, however, may be omitted if a suitable heat treatment is given. A central portion 132a of a pin 132 constitutes a tooth face to be contacted with a sprocket tooth face. A snap ring 36 is fitted on the pin 132 in a notch 304a of the inside link plate 304, and a spacer 37 is interposed between the inside and outside link plates 304 and 404. An outside collar 38 is fitted on a reduced-diameter end portion 132c of the pin 132, and is fixed by inserting a split pin 39 into a cross-axis hole in the pin end portion 132c. A lubricant filled in an eccentric hole 132f is supplied to the respective sliding surfaces of the liner L and the pin 132 through a radial hole 132g by virtue of a centrifugal force. When the diameter of the pin 132 is made large, the projected area of the bearings is made large to be suited for the heavy load use.

According to the first to fourth embodiments described above, the individual pins are rotatably supported by the rolling bearings or plain bearings. In fifth to eleventh embodiments which will be described below, however, pins are supported by rolling bearings and also plain bearings.

Figure 5A:
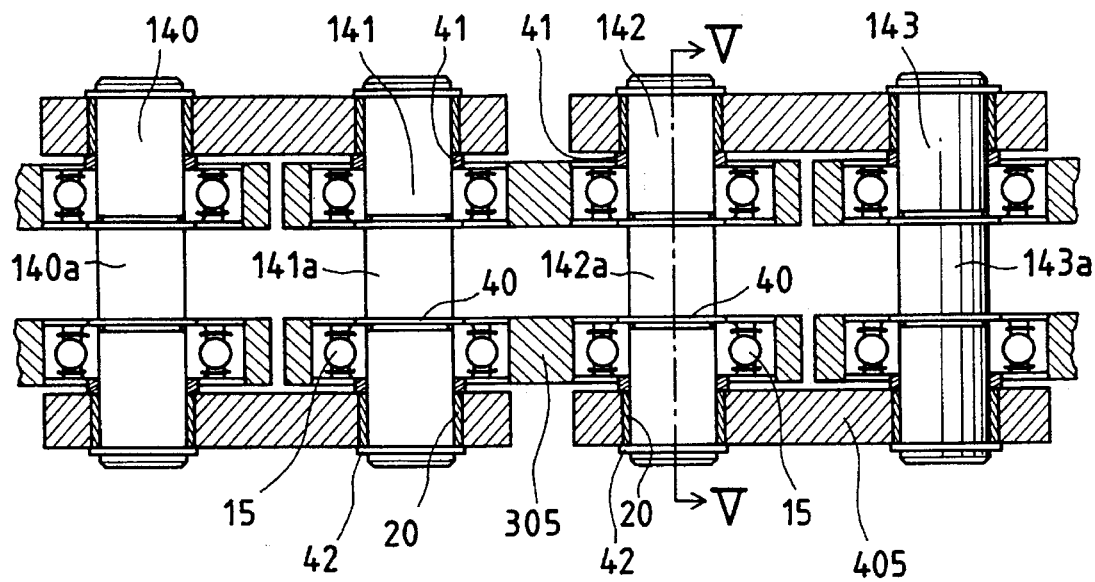
FIG. 5a is a plan sectional view of a chain according to a fifth embodiment of the present invention.
Figure 5B:
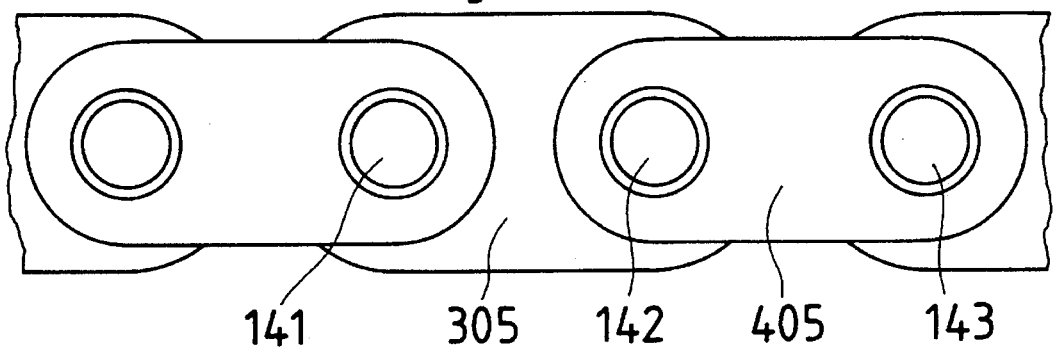
FIG. 5b is a side view of this chain.
Figure 5C:
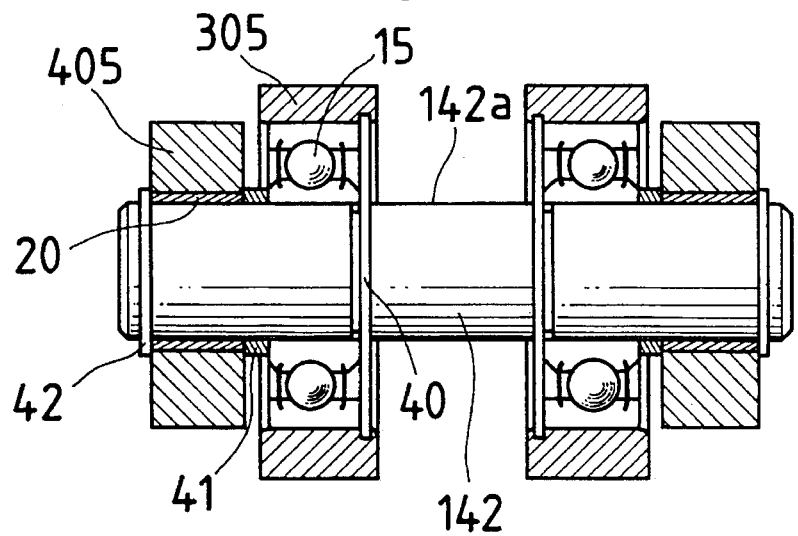

FIGS. 5a, 5b and 5c show a fifth embodiment of the present invention.

Pins 141 and 142 are connected with each other by inside link plates 305, while pins 142 and 143 are connected by outside link plates 405. Central portions 140a–143a of pins 140–143 constitute tooth faces to be engaged with a tooth face of a sprocket. A rolling bearing 15 is attached to each end portion of each inside link plate 305, while a plain bearing 20 is attached to each end portion of each outside link plate 405. The pin 141 is supported by the rolling bearings 15 of the inside link plates 305 and the plain bearings 20 of the outside link plates 405.

As shown in FIG. 5b, the inside and outside link plates 305 and 405 have profiles obtained by connecting two semicircles of the same diameter by two parallel straight lines, i.e., the shape of a cucumber. The radius of each end portion of the inside link plate 305 is greater than the radius of each end portion of the outside link plate 405. Both link plates can be made to have a profile constricted in the middle portion for lighter weight, as shown in the first embodiment.

A spacer 41 is interposed between the inside and outside link plates 305 and 405. An O-ring may be used as the spacer 41. Snap rings 40 and 42 are arranged on the inner end face of the inside link plate 305 and the outer end face of the outside link plate 405, respectively, whereby axial deviation can be prevented while leaving narrow gaps. As the rolling bearings are arranged in the front and rear in this type, the pitch is relatively long.

When the chain engages the sprocket, the adjacent inside and outside link plates 305 and 405 bend relatively to each other. At that time, according to the present embodiment, as the pins 140–143 are rotatably supported by the plain bearings 20 and also rolling bearings 15, the pins 140–143 rotate with respect to the rolling bearings 15 whose frictional resistances are relatively small, while the plain bearings 20 remain substantially fixed. When the pins slide onto the sprocket tooth face, however, a frictional torque acts between the plain bearings 20 and the pins 140–143, thereby causing the pins to rotate slightly with respect to the outside link plates 405, so that wear is spread equally throughout the circumference of the pin without being concentrating on a limited portion.

Figure 6A:
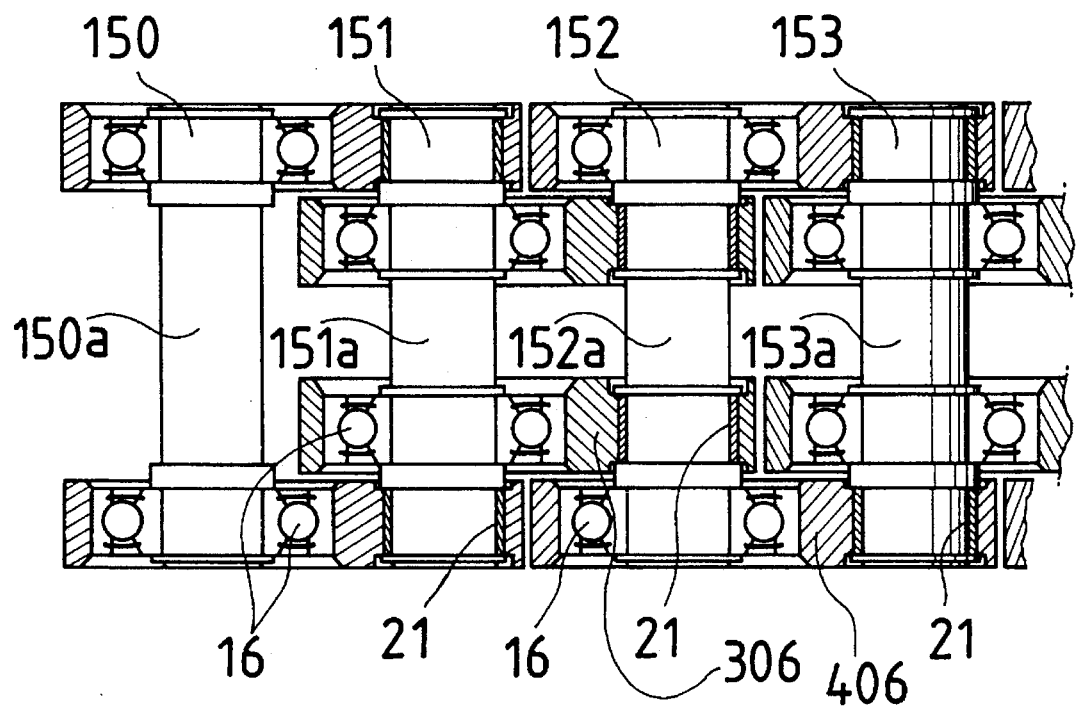
FIG. 6a is a plan sectional view of a chain according to a sixth embodiment of the present invention.
Figure 6B:
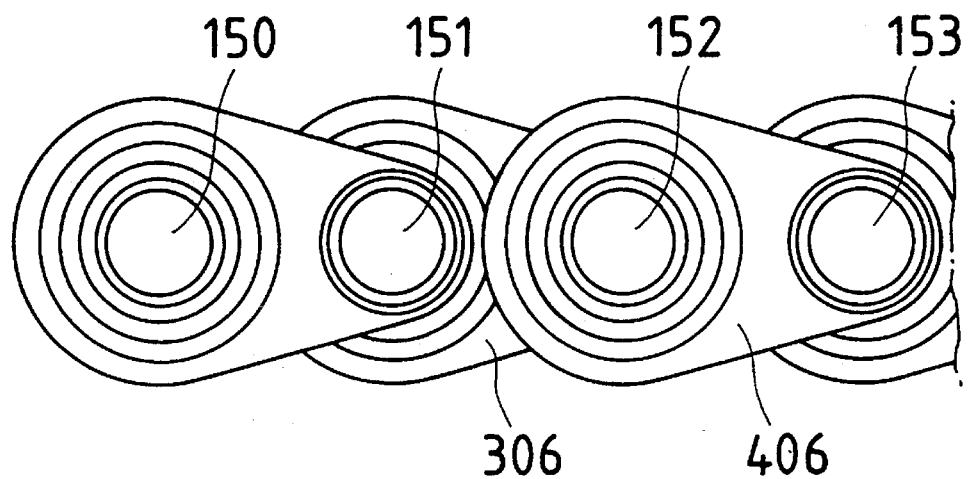
FIG. 6b is a side view of this chain.

FIGS. 6a and 6b show a sixth embodiment of the present invention.

Inside link plates 306 and outside link plates 406 of the present embodiment are of the same shape, and have profiles which are obtained by connecting a large circle and a small circle with two straight lines, i.e., the shape of an eggplant, as shown in FIG. 6b. Rolling bearings 16 are attached to the larger end portion of each of the link plates 306 and 406, and plain bearings 21 to the smaller end portion. The inside link plates 306 and the outside link plates 406 are arranged so that their positions are from one another by a single pitch. A pin 151 is rotatably supported by the rolling bearings 16 of the inside link plates 306 and the plain bearings 21 of the outside link plates 406, while a pin 152 is rotatably supported by the plain bearings 21 of the inside link plates 306 and the rolling bearings 16 of the outside link plates 406. Central portions 150a–153a of pins 150–153 constitute tooth faces to be engaged with a tooth face of a sprocket. In this type, the radius of each end portion of the link plates to which the rolling bearings are attached is large, while the radius of the end portion of the link plates to which the plain bearings are attached is small. Therefore, the distance between the pins, i.e., the pitch, can be reduced.

FIGS. 7a, 7b and 7c show a seventh embodiment of the present invention.

Adjacent pins 161 and 162 are connected by inside link plates 307, and adjacent pins 162 and 163 which are not connected by the inside link plates 307 are connected by outside link plates 407. The inside link plates 307 hold an outer ring 17o of a rolling bearing 17 by loose fitting at each end portion thereof. The opposite ends of the outer ring 17o of the rolling bearing 17 are supported individually by a pair of inside link plates 307, and the central portion of the outer ring 17o is used as a tooth face to be engaged with a sprocket. In the present embodiment, wide needle roller bearings are used as the rolling bearings 17. Although the illustrated bearings have an inner ring, the inner ring may be omitted in the case where compactness and lightness in weight are particularly required. A plain bearing 22 is attached to each end of each outside link plate 407, and each of the pins 161, 162 and 163 is rotatably supported by one rolling bearing 17 and two plain bearings 22. The overall chain length contains an even number of pitches.

Figure 8A:
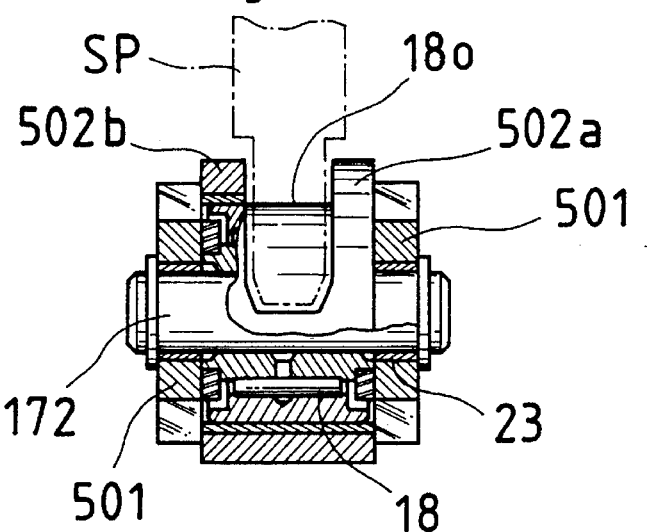
FIG. 8a is a cutaway front view of a chain according to an eighth embodiment of the present invention.
Figure 8B:
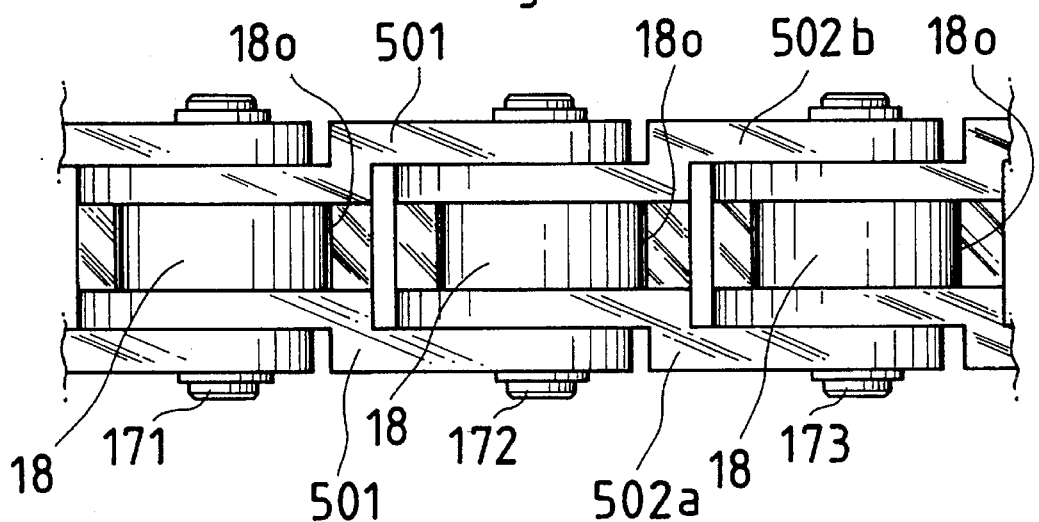
FIG. 8b is a plan view of this chain.
Figure 8C:
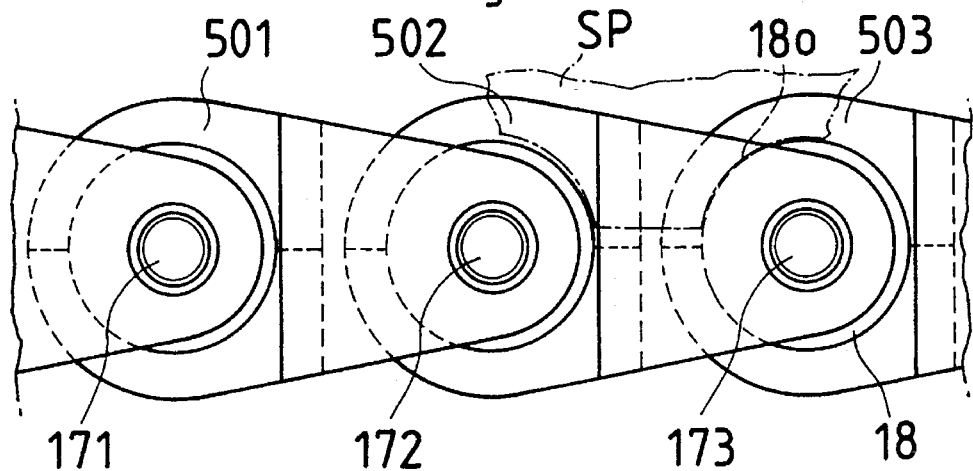
FIG. 8c is a side view of this chain.

FIGS. 8a, 8b and 8c show an eighth embodiment of the present invention.

In the present embodiment, offset-type link plates are adopted in place of the straight-type link plates in the first to seventh embodiments described above.

As shown in FIG. 8c, each of link plates 501–503 has a profile which is obtained by connecting a large circle and a small circle with two straight lines. As shown in FIG. 8b, the smaller end portion of each link plate is offset outward from the larger end portion. Two plates 502a and 502b are combined to form the offset link plate 502. The link plate 502 may be formed by integral molding.

The link plates 501 connect pins 171 and 172, while the link plate 502 connects pins 172 and 173. The larger end portion of the link plate 502 holds an outer ring 18o of a wide rolling bearing 18 by loose fitting, and a plain bearing 23 is provided at the smaller end portion. Thus, the pin 172 is supported by the rolling bearing 18 of the offset link plate 502 and the respective plain bearings 23 of the link plates 501. In the present embodiment, a needle rolling bearing is used as the rolling bearing 18. The pin 172, offset link plate 502, rolling bearing 18 and plain bearings 23 constitute one unit of a chain, and one rolling bearing is used with each pin.

As shown in FIG. 8a, a sprocket SP to be engaged with the chain has a tooth form partly tapered at an end thereof. That part of the offset link plate 502 which receives a sprocket tooth has a cut shape so as not to hinder the entry of the sprocket tooth. As in the seventh embodiment, the outer peripheral surface of the outer ring 18o of the rolling bearing 18 is used as a tooth face to be engaged with the sprocket tooth. The overall chain length contains an odd number of pitches or an even number of pitches.

Figure 9:
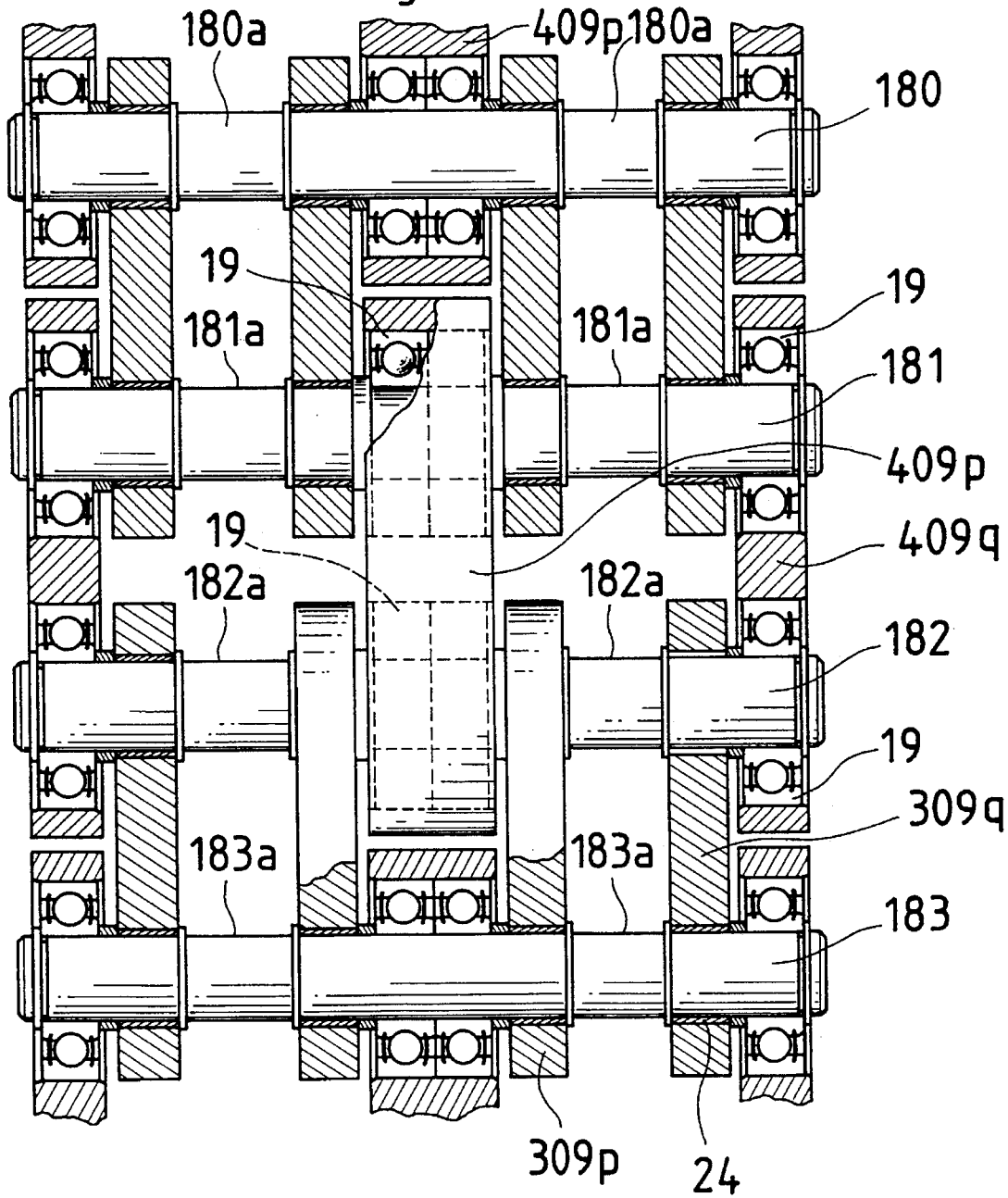
FIG. 9 is a plan sectional view of a double-row chain according to a ninth embodiment of the present invention; .

FIG. 9 shows a ninth embodiment of the present invention. This embodiment represents a multiple-row chain which is suitable for high-load drive and conveyance.

In this embodiment, each link plate has a profile obtained by connecting two semicircles of the same diameter with two parallel straight lines. Rolling bearings 19 are attached respectively to the front and rear portions of an outside link plate 409q. Two rolling bearings with the same size as the rolling bearings 19 attached to the outside link plate 409q are arranged side by side and mounted on a central link plate 409p which is formed integrally by combining two plates. A plain bearing 24 is attached to each end portion of each of inside link plates 309p and 309q. Those portions 180a–183a of pins 180–183 between the inside link plates 309p and 309q, and the outer peripheral surfaces of the respective outer rings of the rolling bearings 19 attached to the central link plates 409p constitute tooth faces to be in contact with a sprocket. As in the eighth embodiment, each central link plate 409p is partially cut out so as not to hinder the entry of a sprocket tooth.

Figure 10A:
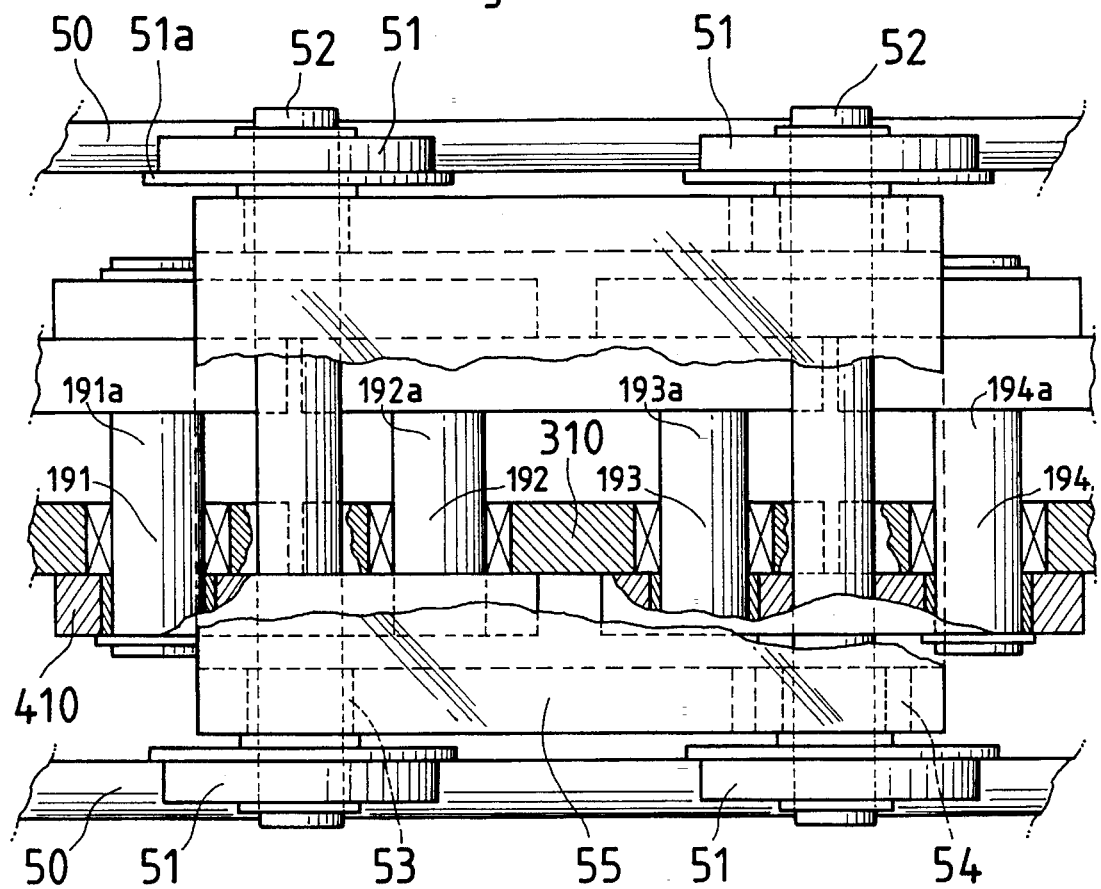
FIG. 10a is a cutaway plan view of a chain with guide rollers according to a tenth embodiment of the present invention.
Figure 10B:
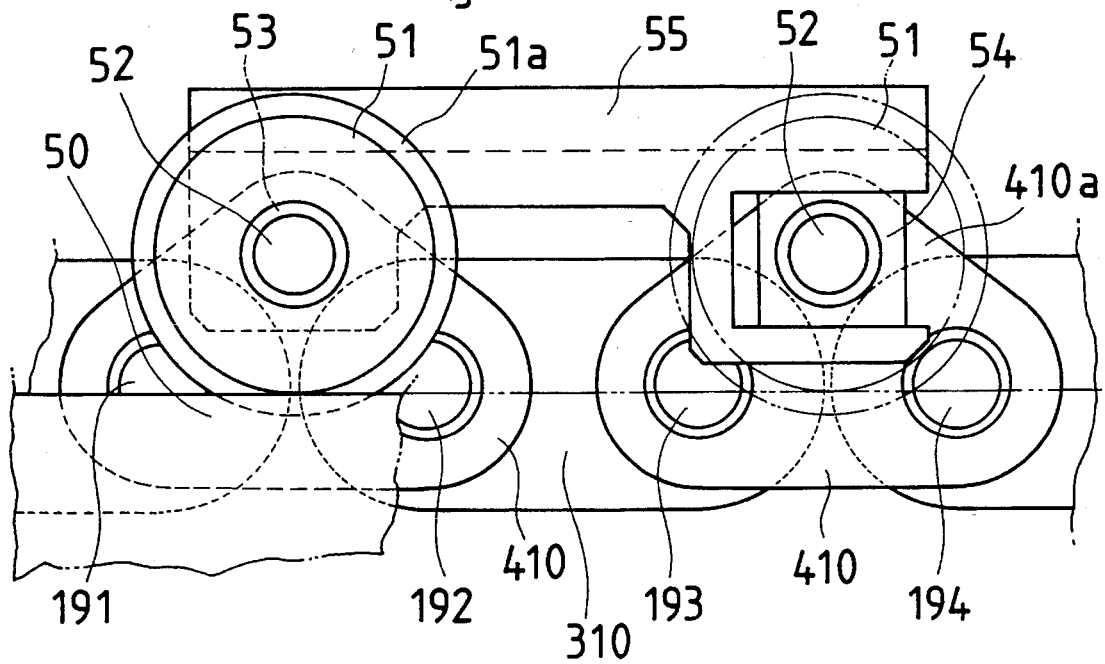
FIG. 10b is a side view of this chain.

FIGS. 10a and 10b show a tenth embodiment of the present invention.

In a conventional chain for conveyance, in general, guide rollers are arranged on extended portions of each pin. If guide rollers are arranged on the extended portions of each pin in the chains of the present invention, however, the pins always rotate under load, accelerating unnecessary wear of the bearings. When using the guide rollers in the chains of the present invention, therefore, the central portion of each outside link plate 410 is bulged so that a stem 52 is supported by bulged portions 410a, as shown in FIGS. 10a and 10b. Guide rollers 51, each having a collar 51a, are connected to each other by the stem 52, and roll on guide rails 50.

The distance between two adjacent stems 52 changes when the chain engages a sprocket. To comply with this, a carriage 55 mounted on the stems is supported on one stem with a rotary kinematic pair 53 and on the other stem with a kinematic pair 54 which allows rotating and sliding motions. In the present embodiment, individual pins 191–194 are rotatably supported by rolling bearings attached to inside link plates 310 and plain bearings attached to the outside link plates 410. Pin central portions 191a–194a constitute tooth faces.

Figure 11A:
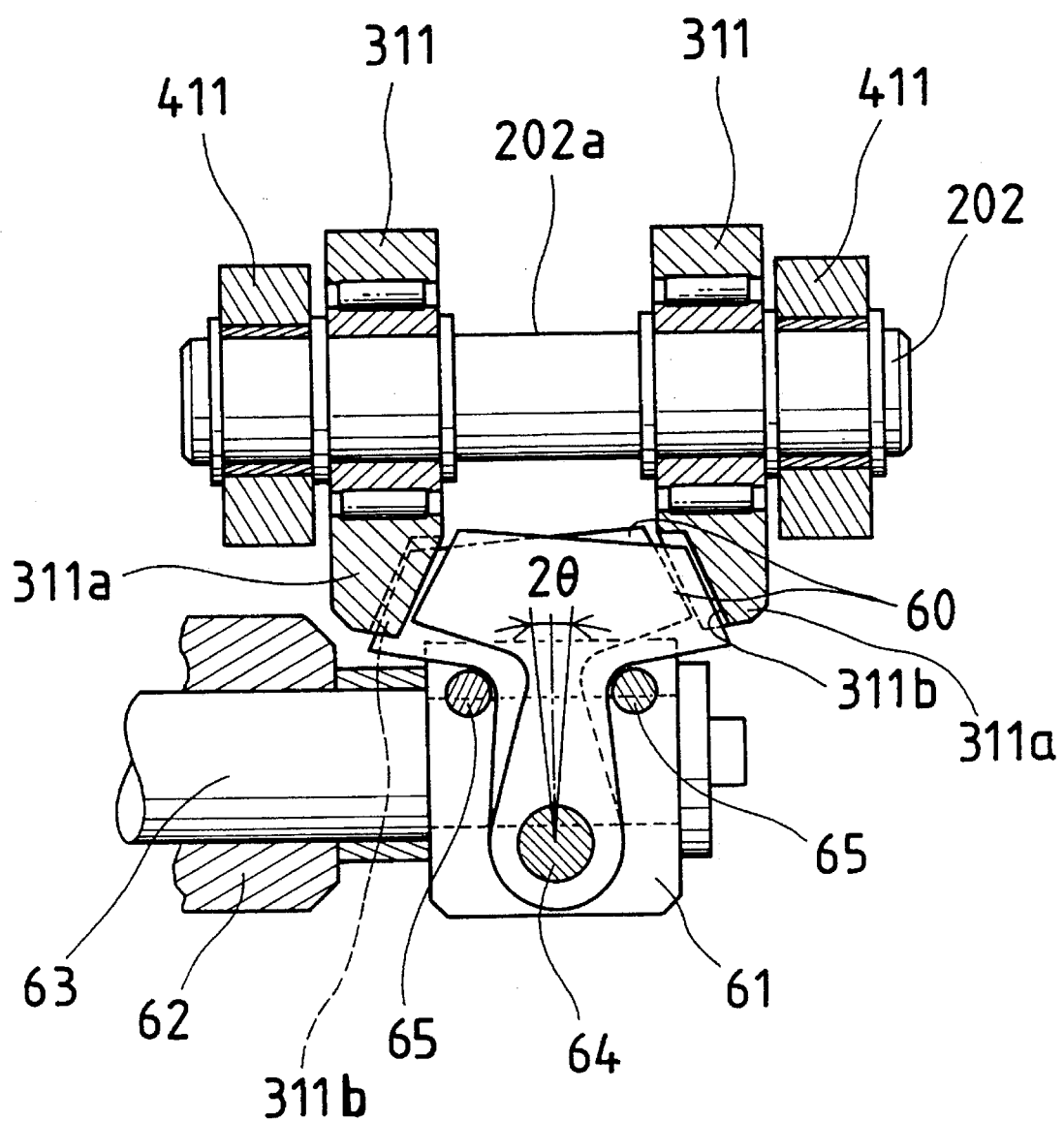
FIG. 11a is a front sectional view of a chain with a slat drive mechanism according to an eleventh embodiment of the present invention.
Figure 11B:
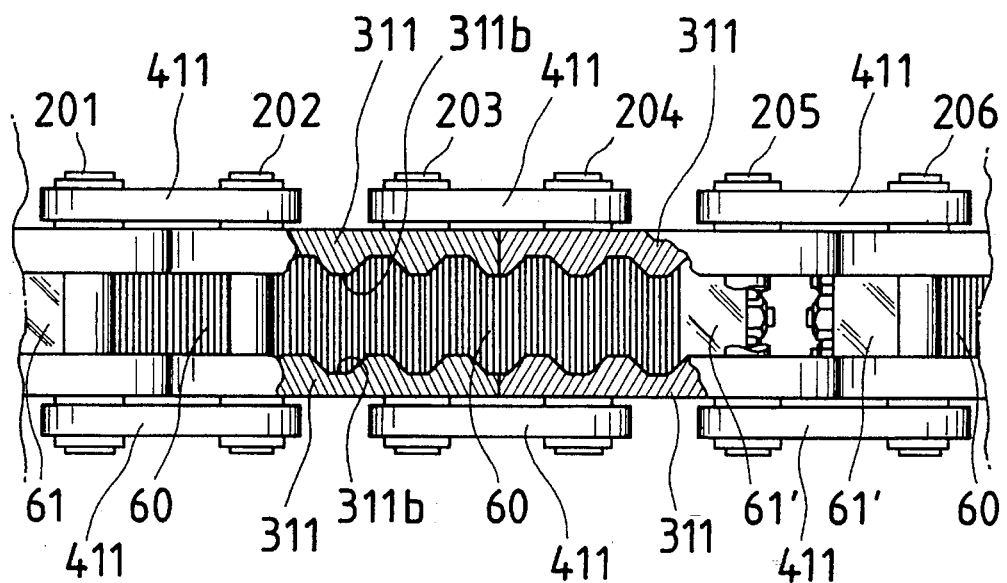
FIG. 11b is a cutaway plan view of this chain.
Figure 11C:
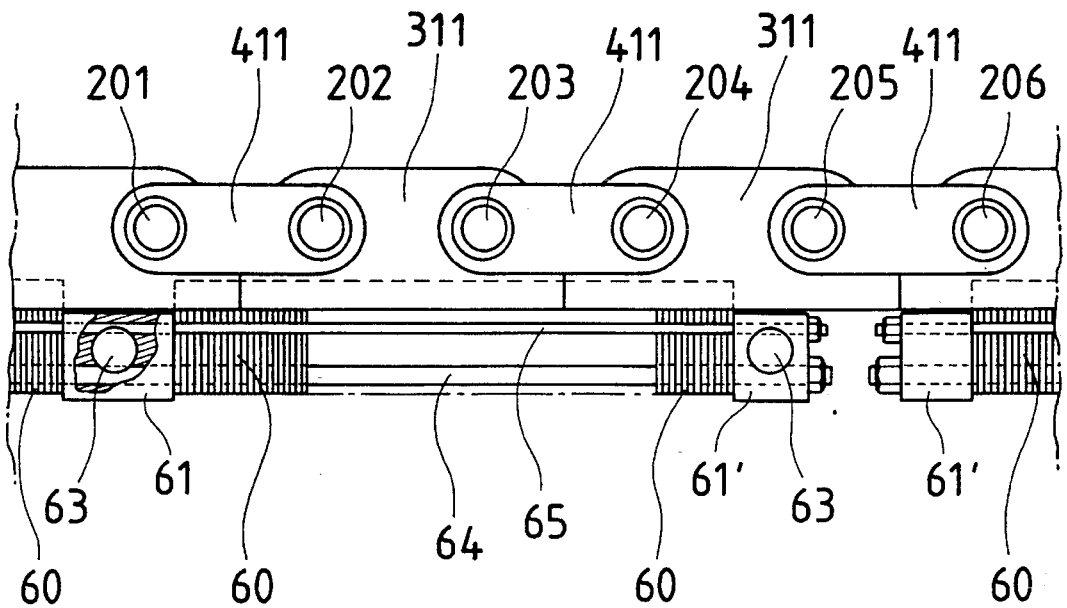
FIG. 11c is a cutaway side view of this chain.

FIGS. 11a, 11b and 11c show an eleventh embodiment of the present invention.

This embodiment relates to a functional chain, such as disclosed in Japanese Patent Laid-Open Publication Nos. 5-4708 and 5-306086, in which teeth are arranged to engage hard leaves (slats) which make a linear or angular reciprocating motion in the surface direction (lateral motion in FIG. 11a).

As shown in FIG. 11a, opposite bulging portions 311a are formed respectively on the lower ends of a pair of inside link plates 311 which are arranged facing each other.

Left- and right-hand tooth portions 311b are formed on the respective bulging portions 311a of the inside link plates 311 so that the top of each tooth on one side faces the bottom of each corresponding tooth on the other side. A number of hard leaves 60, which are laterally swingable, slightly slide to fill the space between the tops and bottoms of the teeth, forming a tooth form to engage the tooth portions 311b. At that time, the hard leaves 60 makes an angular reciprocating motion within the range of an angle 2θ around a shaft 64 parallel to the advancing direction. A moving body 62 is attached to each of slat holders 61 and 61' by means of a supporting shaft 63, and the moving body 62 moves with the chain. Auxiliary parallel shafts 65 serve to reinforce the slat holder 61 and prevent the slats 60 from excessive swinging motion. In the present embodiment, pins 201–206 are connected to each other by the inside link plates 311 and outside link plates 411. As shown in FIG. 11a, a central portion 202a of the pin 202 constitutes a tooth face to be engaged with a sprocket.

According to the present invention, the tooth face of the chain is in rolling contact with the sprocket tooth face, so that friction and wear are reduced. Since the points of contact continually change without local concentration of wear, the progress of wear of the tooth face is made small. Also, the link plates are bent with low friction as they bend when the chain is brought into engagement with the sprocket. Diameters of the pins are much greater than that of the pins of conventional chains and the strength of the chain is made adequately large, so that the same load-carrying capacity can be obtained with the chain of a smaller size. Further, less friction brings a reduction of power loss and less wear brings a reduction of an elongation of the chain. In transportation use, therefore, positioning errors are so small that the chain can be applied to both high-speed and heavy-load use if the appropriate bearings are selected.

Furthermore, when the pins are arranged to be supported by rolling bearings and also plain bearings, the number of rolling bearings can be reduced, so that the weight and cost are lowered. In cases other than the ones described as the foregoing embodiments, various functions can be given to the extended portions of pins and link plates.

I claim:

1. A chain comprising:

a plurality of pins arranged parallel to one another at regular intervals;

first link plates for connecting each of two adjacent pins among said plurality of pins;

second link plates for connecting each of two adjacent pins not connected by means of said first link plates, among said plurality of pins;

at least one rolling bearing attached to one of said first and second link plates; and a plain bearing attached to the other of said first and second link plates, each of said pins being supported by said rolling bearing and said plain bearing.

2. A chain according to claim 1, wherein each of said plurality of pins has a tooth face to be directly in contact with a tooth face of a sprocket.

3. A chain according to claim 1, wherein an outer ring of said rolling bearing has a tooth face to be directly in contact with a tooth face of a sprocket.

4. A chain according to claim 1, wherein each said first link plate has a rolling bearing at both end portion thereof, and each said second link plate has a plain bearing at both each end portion thereof.

5. A chain according to claim 4, wherein said first and second link plates has a profile obtained by connecting two semicircles of the same diameter with two parallel straight lines.

6. A chain according to claim 1, wherein each said first link plate and each said second link plate have a rolling bearing at one end portion thereof and a plain bearing at the other end portion thereof.

7. A chain according to claim 6, wherein said first and second link plates has a profile obtained by connecting the respective circumferences of two circles of different diameters with two straight lines.

8. A chain according to claim 1, further comprising a pair of guide rollers to roll individually on rails, a stem for connecting said guide rollers, and a carriage supported by said stem, wherein one of said first and second link plates have bulged portions and said stem is rotatably supported by said bulged portions.

9. A chain according to claim 1, wherein one of said first and second link plates have bulged portions, and tooth portions are formed individually on the opposite bulged portions so that a top of each tooth on one side faces a bottom of each corresponding tooth on the other side, said tooth portions being engageable with a tooth form formed of hard leaves swingable in a surface direction thereof.

* * * * *

UNITED STATES PATENT AND TRADEMARK OFFICE
CERTIFICATE OF CORRECTION

PATENT NO. : 5,562,558
DATED : October 8, 1996
INVENTOR(S) : Masao KUBOTA

It is certified that error appears in the above-indentified patent and that said Letters Patent is hereby corrected as shown below:

TITLE PAGE [57] ABSTRACT

Line 2, after "has", insert --pin--.

Column 1

Line 40, "structure at pin-bush-roller" should be --structure, pin-bush-roller--.

Column 2

Line 33, "FIG. 5c is sectional" should be --FIG. 5c is a sectional--.

Column 3

Line 62, "Pings" should be --rings--;

Line 65, "Pings" should be --rings--.

Column 6

Line 14, after "are", insert --differentiated--.

UNITED STATES PATENT AND TRADEMARK OFFICE
CERTIFICATE OF CORRECTION

PATENT NO. : 5,562,558
DATED : October 8, 1996
INVENTOR(S) : Masao KUBOTA

It is certified that error appears in the above-indentified patent and that said Letters Patent is hereby corrected as shown below:

<u>Column 8</u>

Line 1, "31lb" should be --311b--;

Line 7, "31lb" should be --311b--.

Signed and Sealed this

Eighth Day of April, 1997

*Attest:*

BRUCE LEHMAN

*Attesting Officer*   Commissioner of Patents and Trademarks